United States Patent [19]

Subas et al.

[11] Patent Number: 5,247,438
[45] Date of Patent: Sep. 21, 1993

[54] PERSONAL TIME MANAGEMENT SYSTEM AND METHOD

[75] Inventors: Sean S. Subas, Kensington; Robert Fukuda, El Sobrante, both of Calif.

[73] Assignee: Infoassist, Inc., Kensington, Calif.

[21] Appl. No.: 859,980

[22] Filed: Mar. 30, 1992

[51] Int. Cl.5 .......................... G06F 15/38; G06G 7/60
[52] U.S. Cl. .................................................... 364/400
[58] Field of Search ................... 364/401, 419, 705.07, 364/705.08, 402; 340/722

[56] References Cited

U.S. PATENT DOCUMENTS 4,937,743  6/1990  Rassman et al. ..................... 364/401

OTHER PUBLICATIONS

MacIntosh System Software User's Guide, Version 60; 1988, pp. 6-94.
Connections Manual, pp. 3-43 to 3-57, Concentrix Technology, Inc., publication date unknown.
Daymaker Manual, pp. 1-8, Pastel Development Corporation, publication date unknown.

Primary Examiner—Roy N. Envall, Jr.
Assistant Examiner—Ari Bai
Attorney, Agent, or Firm—Donald L. Beeson

[57] ABSTRACT

A personal time management system includes a computer device having a display screen on which is generated a primary visual display comprised of individual event time bars and a composite conflict time bar. The event time bars graphically display times for scheduled events by means of visual markers occupying one or more slot times on selected time bars. The composite conflicts time bar simultaneously displays all the visual markers of the event time bars so as to provide a positive indication of a conflict. The visual markers representing scheduled events can readily be placed and removed directly on the primary visual display by one or two clicks of a mouse on a selected event time bar. Events can thereby be scheduled and rescheduled without the need to pull up and enter information on a secondary screen display.

10 Claims, 6 Drawing Sheets

PERSONAL TIME MANAGEMENT SYSTEM AND METHOD

BACKGROUND OF THE INVENTION

The present invention generally relates to devices and techniques for keeping track of and managing personal time schedules, and more particularly to techniques for entering and displaying scheduled events on a computer device for recall by the user. The invention involves an efficient and unique way of entering, displaying, and manipulating time schedules in graphic form on a visual screen display using a pointing device commonly referred to as a "mouse".

Calendar programs for computers are well-known. A typical calendar program will provide for the entry of event data, such as appointments, and to do items, in text form in various user selectable description fields for a selected calendar day. Such programs typically feature the ability to quickly cursor to a selected day, enter complete event descriptions, indicate time of events, and provide various reminder signals, such as a computer generated beep or alarm. While the aforementioned calendar programs enable a user to record and display just about any form of calendar information, such programs are relatively cumbersome to use, especially because the entry screens do not permit simultaneous viewing of previously scheduled events for the same day, and do not readily alert the user to a conflict between different calendared events.

For ease of spotting scheduling conflicts and to permit quick, at-a-glance, calendar status checks, calendar programs have been devised which graphically represent scheduling information. A known form of graphic presentation for scheduling information is a Gantt chart consisting of rows of time bars having a common time scale wherein the timed segments or slot times for described calendar events are marked out as shaded portions on the time bars.

However, existing calendaring programs using the Gantt chart type of display are still relatively cumbersome to use, in that, the user typically must input the calendar data which generates the Gantt chart display on a separate screen, typically a pop-up type of screen. Such screens require a number of entry steps and also temporarily obliterate some or all of the primary screen. Existing calendar programs also suffer from the disadvantage that they generally give no positive indication of a conflict between calendar events other than by comparing the relative positions of the marked out time segments on the Gantt chart.

The present invention overcomes the above drawbacks of existing calendaring programs by providing a personal time management system and method which permits event information to be inputted in graphic form directly onto a primary display screen without the need to pull up a separate, intrusive pop-up screen for entering calendar events. The invention additionally provides a positive indication of a conflict between calendared events which is immediately visually apparent and which does not require a visual comparison between shaded segments of a Gantt chart. The most essential calendaring information can be entered and displayed on a single primary visual display for improved at-a-glance calendar status checks. The personal time management system of the invention will be seen to provide its user with a way to enter calendar information and plan out an entire day on a single screen by entering, or changing an event by an easily made single or double click of a mouse.

SUMMARY OF THE INVENTION

In accordance with the invention, program means for a computer device having a display screen generate a primary visual display having user-selectable display elements associated with each selectable calendar day. The display elements include separate and selectable time graphs associated with separate identifiable calendar events. The time graphs are preferably in the form of a Gantt chart, that is, a plurality of separate event time bars arranged in parallel rows such that the graphic representation of scheduled events on the time bars can easily and visually be compared to one another. It is understood, however, that the invention is not limited to a Gantt chart form of graphic presentation, but may be adapted to representing time in other graphical forms, such as, for example, providing a pictorial representation of a plurality of clocks for each scheduled event.

The invention involves marking user-selectable slot times on a selected event time graph, and doing so directly on the primary visual display as opposed to generating a graphical display by entering information into separate pop-up screens. Specifically, each of the event time graphs displayed on the primary visual display are divided into user-selectable slot times characterized by a start time and an end time. The slot time intervals, that is the time between the start time and end time, can be set at convenient increments, such as fifteen minute increments. It is also contemplated that the slot time intervals can be changed by the user.

Screen pointer means in the form of a mouse having a hand actuated clicking element provides means for pointing to and selecting user interface display elements generated on the display screen. The mouse particularly provides means for pointing to and selecting event slot times on any one of the separate event time graphs so as to enter a visual marker at the slot time. The visual marker will preferably consist of a shaded or blackened area on the event time graph between the slot start time and end time of a single slot time or successive slot times. Selection of a slot time or slot times and the resulting placement of a marker is simply achieved by one or two clicks of the mouse.

In addition to visual slot time markers, means are provided for identifying, in text form, the events associated with each of the marked event time graphs. Such means for identifying events preferably include providing an event description field associated with each of the event time graphs. The event description field appears on the primary visual display and can be selected or opened by a click of the mouse. An event description can thereby be entered directly in the event description field without the need to use a secondary pop-up display which will act to obliterate information on the primary display. A detail screen in the form of a pop-up display can be used in conjunction with the invention to enter expanded event descriptions or other event data as desired.

A further feature of the invention involves providing a composite conflict time graph which combines all the visual markers of the separate event time graphs onto a single composite graphical display thus providing a positive indication of a conflict between events. The composite time graph includes composite slot times corresponding to the event slot times of the event time graphs. Each time an event slot time is marked, the program means of the invention causes the corresponding composite slot time on the composite conflict time graph to be marked. An overlap of scheduled events can be visually indicated by generating a different degree, type, or color of shading in those areas where marked out events overlap. This feature is particularly important where entered events are hidden on the primary display requiring a zoom or scroll function to reveal the event.

Other aspects of the invention involve the ability to use the screen pointing means to point to and deselect a previously marked slot time so that a visual marker is removed, and to extend the time interval of a visual marker by pointing to and selecting an additional slot time on a previously marked event time graph.

It is therefore seen that a primary object of the invention is to provide a personal time management system and method wherein scheduled events can be entered directly onto the display screen of a computer device by means of a mouse or other screen pointing device—this can be done with one or two clikcs per scheduled event—without the need to proceed through more cumbersome and intrusive pop-up screen entry formats and submenus. It is a further object of the invention to provide a computer device and method for displaying calendar event information on the visual display of a computer screen in such a way that calendar conflicts can be readily ascertained by glancing at the visual display. Yet other objects of the invention will be apparent from the following specification and claims.

DETAILED DESCRIPTION OF PREFERRED EMBODIMENT

Figure 1:
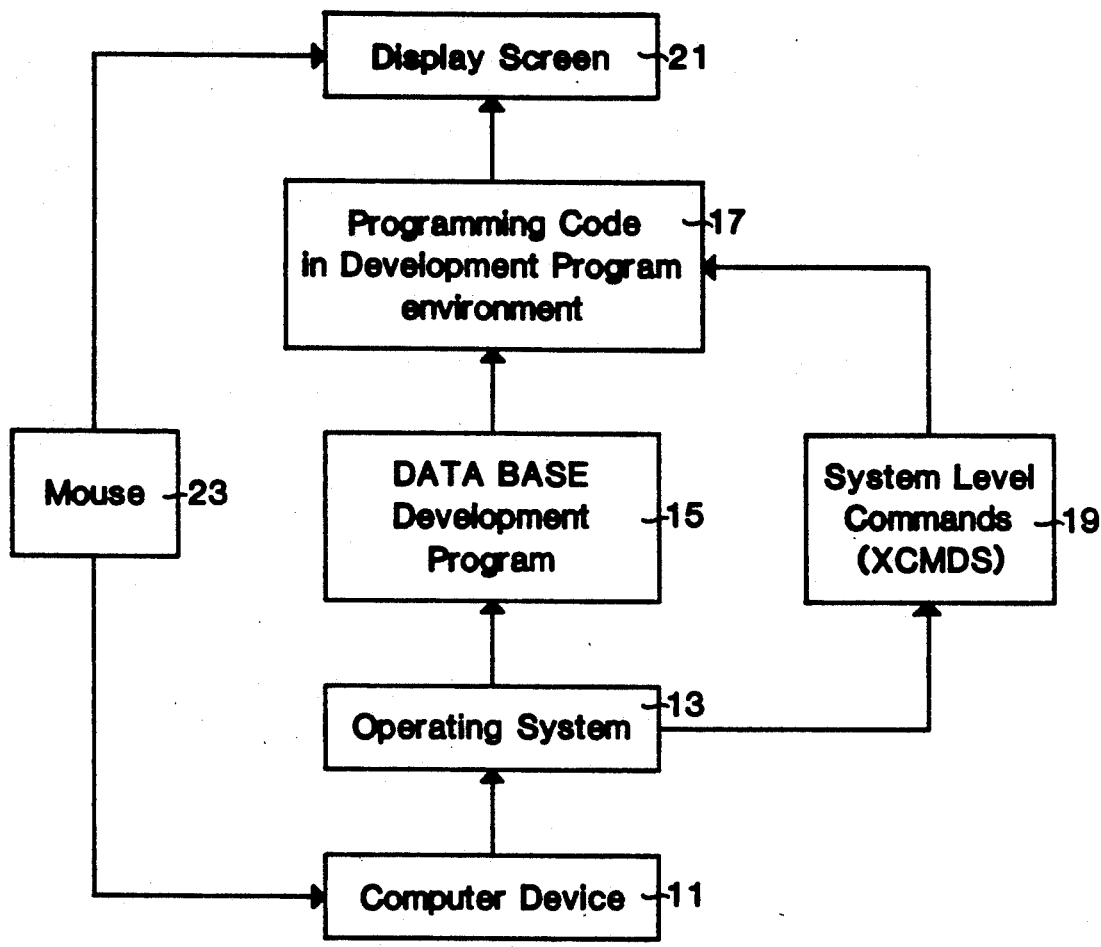
FIG. 1 is a block diagram showing a suitable computer program environment for implementing the invention on a computer device.

Referring now to the drawings, FIG. 1 generally shows the software and hardware environment in which the personal time management system and method of the invention operates. Shown are a computer device 11, an operating system for the computer device 13, a commercially available database development program 15, programming code written in the development program environment 17, system level commands 19 which are utilized in the programming code and a display screen 21 on which the visual display of the invention is generated. Display elements on the display screen are selected and actuated by means of a screen pointer device 23 commonly referred to as a "mouse". Program functions are initiated by "clicking" of the mouse on a user-selected screen element in a manner well-known in the art.

The system and method described herein are described in the following particular hardware and software environment: the computing device is a MacIntosh computer having a MacIntosh operating system of 6.0.7 or later, running the Hypercard TM development program, Version 2.1 or later. The system requirements include a minimum of 2 megabytes of RAM memory, and a minimum of 3 megabytes of hard disk storage.

Figure 2:
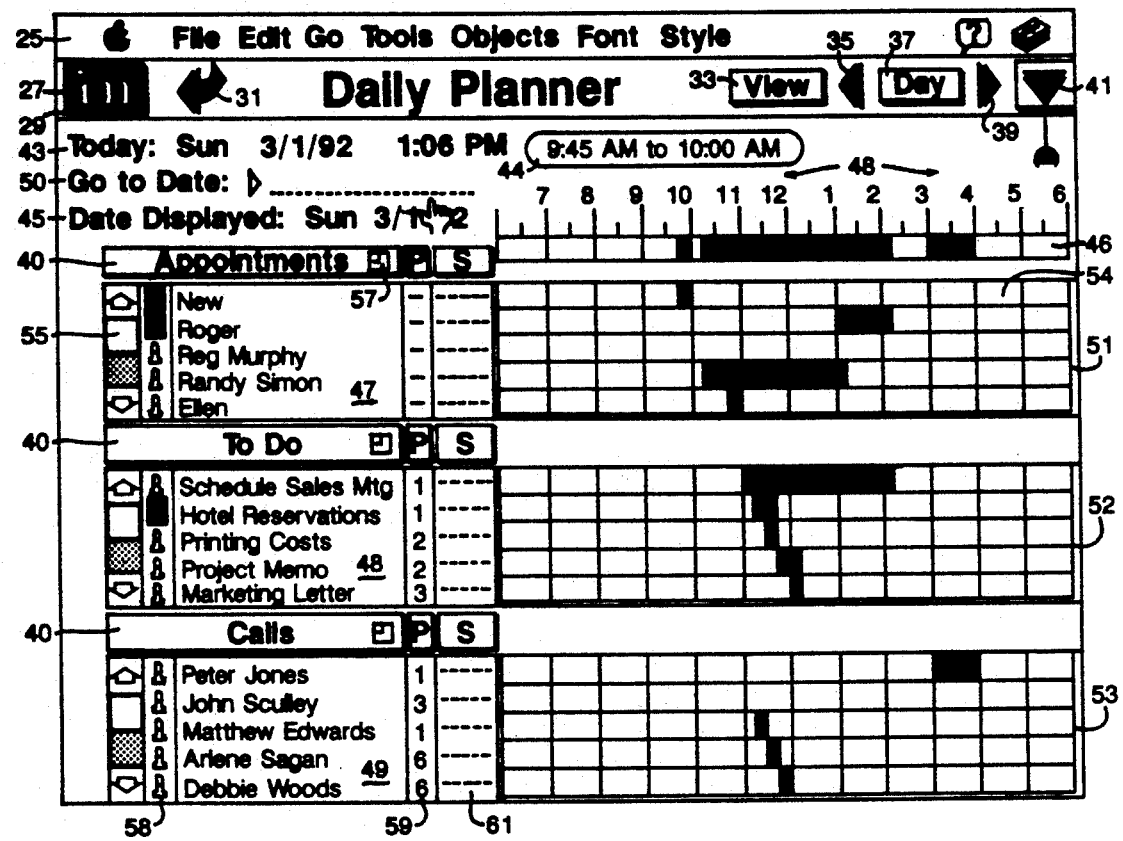
FIG. 2 is a computer generated visual display in accordance with the invention showing marked event time bars and a composite time bar.

FIG. 2 shows a primary visual display that, in accordance with the invention, appears on the display screen 21. The display includes a standard Apple Hypercard TM menu 25 which remains on the screen throughout the execution of the application, and which enables the user to utilize the Hypercard TM facilities. The primary visual display further includes a navigation menu bar 27 below the Apple Hypercard TM menu, the contents of which may vary according to the active screen or "stack". The navigation menu bar includes an "im" icon 29 and return arrowhead icon 31 used to access other program modules or functions; a "View" option to permit adjustment of the calendar time schedule; backward arrowhead icon 35; a selectable time unit display option 37 indicated by the word "Day", but which have additional options of "Week", "Month", and "Year"; a forward arrowhead icon 39; and a down arrow icon 41 which permits user selection between different tasks within the same program module. Each of these user-selectable display elements are background buttons wherein preferably the autohilite property is set to "True". Each user-selectable element can readily be implemented by a person skilled in the programming arts and having experience with the Hypercard TM development program.

The primary display of FIG. 2 additionally includes a display of the current time and date at 43, the calendar date actually displayed at 45, and a user-selectable field 50 denoted "Go To Date" for permitting the user to jump forward or backward to desired dates by typing the date into this field. Below and adjacent these display elements are an event time message strip 44; a composite conflicts time graph shown as a time bar 46 divided into time increment rectangulars which may represent one or more slot times; an event time scale 48 over the conflict time bar; event description fields 47, 48, 49; and event time graph fields 51, 52, 53. As shown, the event time graph fields and event description fields are divided into three categories or sections labeled "Appointments", "To Do", and "Calls". Appointments will be entered into the field's "Appointment" sections 47, 51, the user's to-do reminder list will be entered into the "To Do" sections 48, 52, and telephone call reminders will be entered in the "Calls" sections 49, 53. Each section of the time bar fields is seen to have separate event time graphs in the form of Gantt chart time bars which, like the composite conflict time bar and as further described below, are divided into time increment rectangles.

Other possible user-selectable display elements include user-actuatable scrolling buttons 55, a zoom box button 57, detail icons 58, priority fields 59 and status fields 61.

Each of the above selectable display elements are activated by pointing to the element with a mouse and clicking the mouse as required. A single click on the backward arrowhead 35 takes the user back one time unit (as indicated on the time unit display 37), that is, to the display or "card" for the previous time unit. Each further click takes the user back one additional unit, for example, one additional day. At the program level, such click of the mouse on the backward arrow produces a mouse-up system message that takes the name of the time unit background button and calculates the previous time unit from today's date. To do this, today's date is first converted into seconds and then the program calculates the previous time unit, taking into account leap year, a short February month, and thirty day months and thirty-one day months by different function handlers in the stack script. If a card exists for a calculated date, then the Hypercard TM program goes to that particular date; otherwise it creates a new card. Each day will have one card in a stack for producing a screen display for that particular day.

Clicking on the time unit display option 37 causes the mouse-down system message to call a program routine denoted as the "HPopUpMenu XFunction" with arguments as different time units and pop-up menu locations in local Hypercard TM Pixel coordinates. The XFunction HPopUpMenu returns the selected time unit. Since the name of the background button is then changed into the selected time unit, it displays the selected time unit on the screen. "HPopUpMenuXFunction" is a commercially available program that would be well understood by persons skilled in the programming arts and having experience with the Hypercard TM program.

The forward arrowhead 39 operates in a manner similar to the backward arrowhead except that it takes the user one time unit ahead in reference to the displayed time unit, instead of one time unit backward.

Clicking on the down arrow icon 41 can cause a pop-up menu to be displayed having various possible executable tasks. Examples of options for such a pop-up menu are "Show Today's Calendar", "Show A Monthly Calendar", "Find An Address Book", "Roll Forward To A Specified Date", "Select Reoccurring Events". Such functions are well-known to persons skilled in the art and can be readily implemented.

The "View" background button 33 provides the user with the capability of setting the start time and day lengths for the time scale on the Gantt chart display seen in FIG. 2 and hereinafter described. Preferably the program will permit the user to click on this button and bring up a small pop-up menu with two options: "Set Day Length" and "Set Start Hour". This "View" function gives the user the flexibility of setting different time ranges and different start hours according to the user's work schedule for a particular displayed calendar day.

An example of how the time range or length of day option ("time mode") can be implemented is to provide in the sub-menu selectable options such as: "8 Hours", "9 Hours", "10 Hours", "12 Hours", "18 Hours", "24 Hours". Selection of any one of these day-length options will act to change the event time scale 48 above the composite conflict time bar. If the range is small, the individual time increment rectangles of the rectangular conflict time bar will be proportionately large; if the time range is large, the rectangles will be proportionately small.

If the "Set Start Hour" option on the "View" function pop-up menu is selected, another sub-menu is made to appear which displays different selectable start times for different combinations of day lengths. For example, for a day length of nine hours, the following start time selections could be displayed: 12 a.m., 1 a.m., 2 a.m., . . . 3 p.m. The start hour and day length can be unique for each particular day.

Within the Hypercard TM program environment, the setting of the event time scale through the "View" background button is generally handled as follows: the mouse-down system message calls the program function called the "HPopUpMenu XFunction" with arguments as the selectable pop-up menu and sub-menu items, i.e., "Set Day Length", "Set Start Hour", and "8 Hour", "12 Hour", etc., and pop-up menu location and local Hypercard TM pixel coordinates. The "XFunction HPopUpMenu" program function returns the selected main menu item and the sub-menu item. The time mode (day length) and start hour (offset) are stored as global variables. From the return of the "Start Hour" and "Time Mode" variables the end hour and the number of needed time bar rectangles are calculated. A program function called "UpdateAllTimebars" is executed by sending the function handler to the Hypercard TM background script. This program function, the script for which is set forth in Appendix A, updates all of the event time bar fields 51, 52, 53 in the Appointment section, To Do section and Calls section by executing the following functions:

a. To convert the event time bar fields to the new time modes and/or offset, the function called "TimeLinesToNewMode" is executed. The Hypercard TM script for this function is set forth in Appendix A.

b. To adjust the event time bars in the three event time bar fields to a new format for "Appointments", "To Dos", and "Calls", a program function called "buildTopBarScale" is executed. The Hypercard TM script for this function is shown in Appendix A.

c. To build a new composite conflict time bar with a new format, a function "buildConflictsLine" is executed. The Hypercard TM script for this function is set forth in Appendix A.

Figure 3:
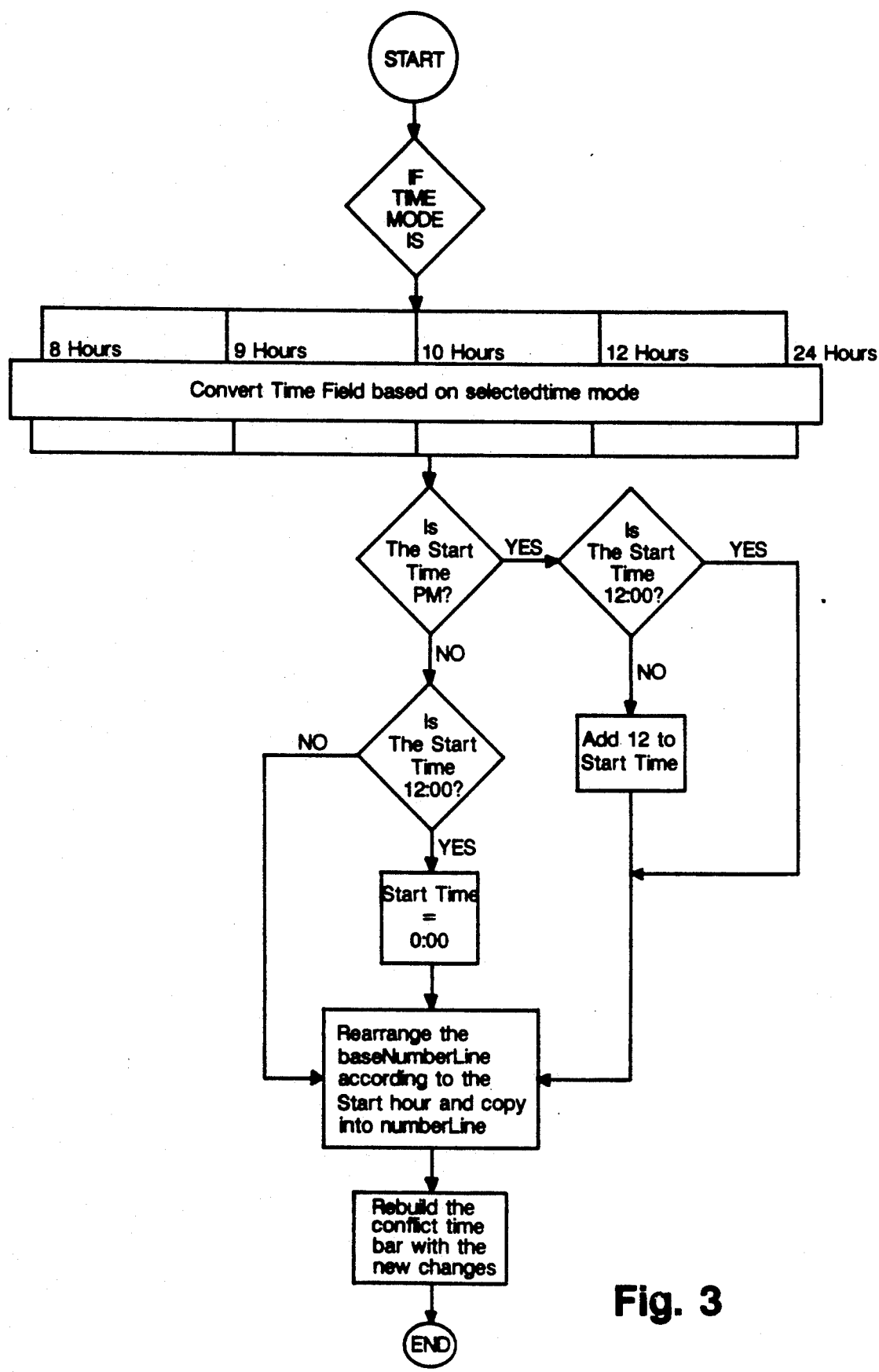
FIG. 3 is a flow chart illustrating the program function for building the time bar time scale on the screen display.

The above described program functions for setting the time scale is generally illustrated in the flow chart of FIG. 3.

Turning the event description fields 47, 48, 49, these fields, as above-mentioned, provide for entering the text of an event description on the primary visual screen. Each event description is entered on an event description line associated with an event time bar located in the adjacent Gantt chart event time bar fields 51, 52, 53. Typically, about five event descriptions would be visible in each of the event description fields at a given time. To view more items on the screen, a suitable zoom function actuated by a zoom button 57 can be provided. Also, since these are scrollable fields, hidden items may be brought into view by scrolling up or down by clicking on the scroll buttons 55.

An event description can be entered on an event description line by a single click on the empty space in this field to bring up a small pointing arrow (not shown) and highlighted rectangle (not shown) defining the event description line. As shown in FIG. 2 (in the Appointments section of the Event Description Fields), the word "new" also appears on this event description line to prompt the user to enter a new event description. A single click in this space can also acts to build the event's associated event time bar in the event time bar field 51, as well as placing dashes in the priority column 59, and status column 61. By further clicking on the highlighted event description line, a new event description can be entered. Hitting the "return" character key saves this event description; whatever is typed out beyond the visible highlighted line is also saved, but cannot be seen on the primary visual display. To view such an extended portion of the description would require pulling up a detailed description by clicking on a detail icon 58. The detail icons can be used to suitably bring up a detail window that has all of the entries of, for example, the Appointment list, in addition to project related fields and time entry fields. The detail window may also provide facilities for setting an alarm for a particular event.

Figure 4:
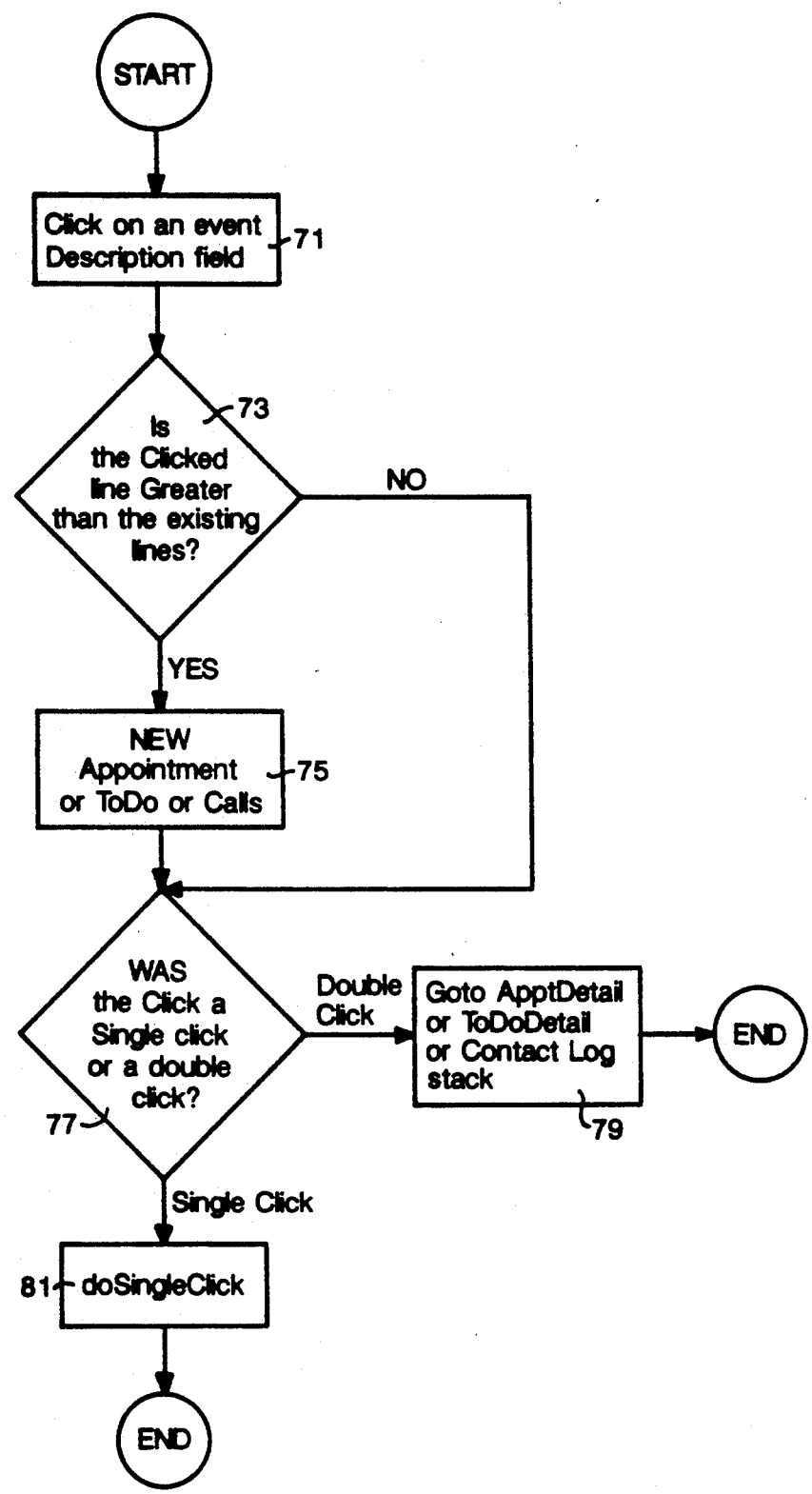
FIG. 4 is a flow chart showing the program function of identifying events (appointments, to-dos, and calls) in an event description field.

The handling of the viewing and entry of information in the event description field is further illustrated by means of the flow chart in FIG. 4. Referring to this flow chart, the program first detects a click of the mouse (block 71) on one of the event description fields 47, 48, 49, i.e., in the "Appointments", "To Dos", or "Calls" section. The program then detects whether the mouse has clicked on an empty line or a previously established event description (block 73). If an empty line is detected, then new "Appointments", "To Dos", or "Calls" are entered by means of program functions called "NewAppt", "NewToDo", and "NewCalls" (block 75). The Hypercard ™ program script for these functions are set forth in Appendix A. After the program determines whether the user has clicked on an empty line or an existing event description, it then looks for another click or sequence of clicks from the mouse (block 77). If a double click is detected, then the program can go to suitable sub-menus such as an appointment detail stack, a to do detail stack, or a phone contact log (block 79). If a single click is detected, then the program executes a "DoSingleClick" function (block 91), the program script for which is set forth in Appendix A.

As noted above, a single click on an empty space in the event description fields causes the program to build a time bar in the event time bar field which is associated with the new event description. The building of this time bar is accomplished through a program function called "GetEmptyBar" which is a program routine which draws the empty time bar in an otherwise empty field. The arguments for the "GetEmptyBar" program routine are the stored Start Time and Time Mode variables. The script for the "GetEmptyBar" program routine is set forth in Appendix A.

Referring further to FIG. 2, each event time bar in the event time graph fields is seen to be divided into easily discerned rectangles representing one hour time increments. Each rectangle can in turn represent one or a series of consecutive slot times, each having a defined starting time and defined end time; in the FIG. 2 display each slot time has a 15 minute increment meaning each visually perceived rectangle represents four slot times. In accordance with the invention, slot times (of 15 minute increments) are blackened or shaded by a single click of the mouse to set an event time.

More specifically, to schedule an event, first the start time of the event is selected by clicking on the respective closest slot time to the desired start time. Upon clicking on a slot time, the program will preferably cause the event time message strip 44 to appear above the composite time bar with the starting time for the selected slot time numerically displayed. To select an end time, the user clicks on the slot time closest to the desired end time. Again, preferably this will cause a numerical display of an end time (corresponding to the defined end time for the selected slot time) to appear in the message strip 44. The clicking on the spaces will also cause the beginning slot time to be blackened in and the end slot time to be blackened in and all slot times between the beginning and end slot time to be blackened in. Simultaneously, the corresponding slot times on the composite conflict time bar 46 will be blackened in. If any portion of the composite conflict time bar being blackened in has already been blackened, then, as seen on the conflict time bar 46 in FIG. 2, the program causes this portion to be shaded differently so that the conflict is visually apparent. When a conflict is apparent, a new time for scheduling a particular event can be easily set by clicking again on the blackened in portion on the event time bar to deselect or remove this visual marker. A new time slot is then selected following the above-described procedures.

As mentioned above, the time intervals for each slot time can suitably be selected to be 15 minutes so that events can be scheduled in 15 minute increments. It is contemplated that events can be scheduled more accurately in the detail window above-described. Changing of the time values in the detail window will also cause changes in the blackened portions of the event time bar and the composite conflict time bar respectively. If changes are made directly on the event time bar, then changes will be reflected on the composite conflict time bar and detail window.

The above-described functions for entering visual markers on the event time bar and updating the event time bar and composite conflict time bar in a detail window are accomplished by various program functions including program functions called "AdjustConflictLine", "GetEmptyBar", "GetFullBar", "GetStartTime", and "GetEndTime". The script for each of these program functions is set forth in Appendix A.

It is noted that the time bars involve background locked rectangular fields, and are built by using different characters of special fonts. The different characters are chosen in accordance to the different start hour and time mode which is obtained from the global variables "TimeMode", "StartTime", and "ViewMode". The composite time conflict bar is built when a card for a calendar day is created. This is done by executing the function handler "BuildTimeBar" described above.

The label fields 40 for the "Appointments", "To Do", and "Calls" sections provide buttons on which the user can click to bring up a small pop-up menu with the menu option such as "New" and "Sort". Selection of a "New" option will create a new item in the event description field by bringing up a small new highlighted rectangle with the word "New". This function would also draw an event time bar for the particular item in the appropriate event time graph field 51, 52, 53. At this point the user can schedule an item by typing the description in the highlighted box and clicking the time in the appropriate time slots as above described.

The label buttons are background rectangular fields, and a click of the mouse on these buttons causes the mouse down system to call the "HPopUpMenu XFunction" with arguments as menu items, such as "New" or "Sort", and pop-up menu location in local Hypercard ™ pixel coordinates. The XFunction HPopUpMenu returns the selected main menu item and submenu item. If the return item is "New", the appropriate function handler "NewAppt", "NewToDo", or "NewCalls" are executed. (See program script for these function handlers in Appendix A.) Suitable function handlers for "Sort" can be provided which can sort event descriptions by priority or status.

Figure 5:
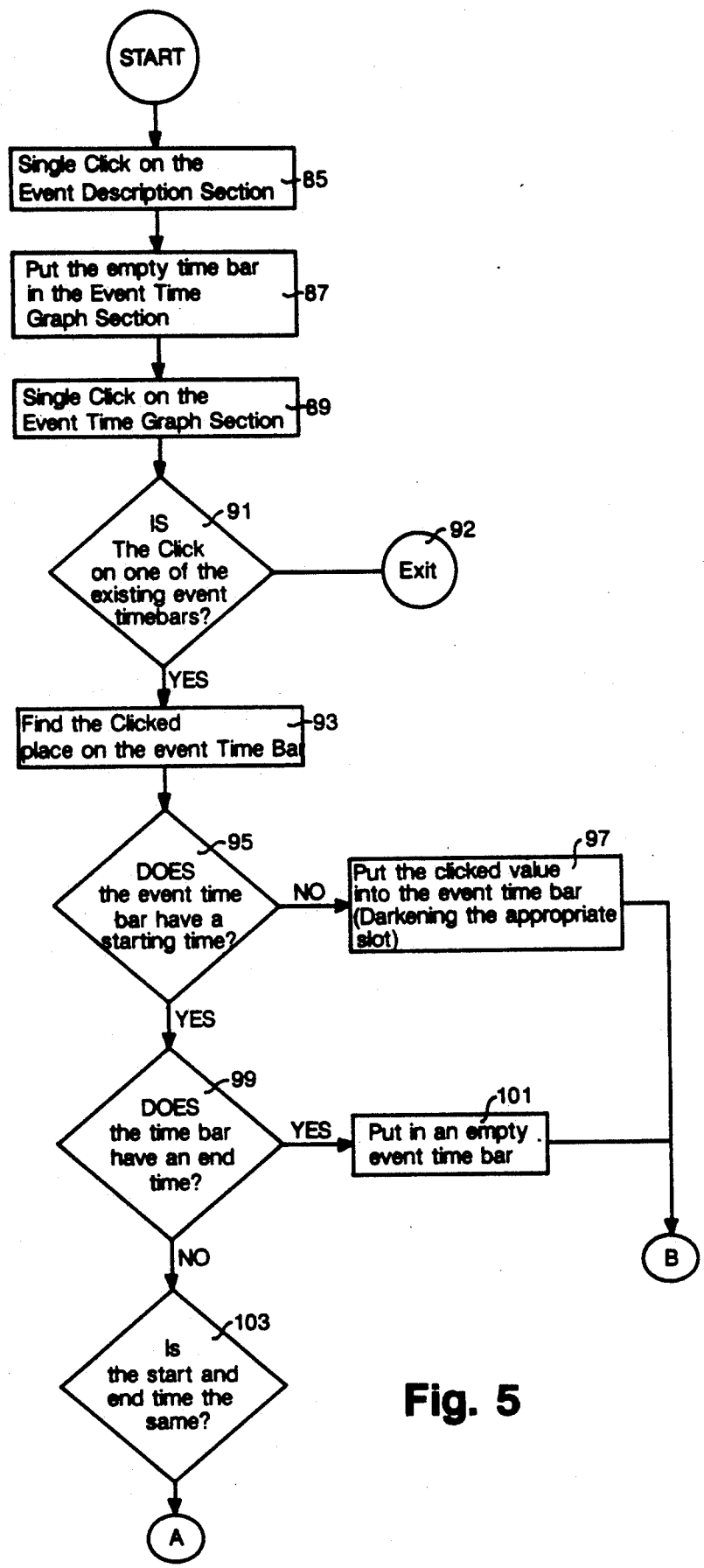
FIG. 5 is a flow chart illustrating the program functions of building a time bar, marking in slot times, and marking the composite conflict time bar for a newly filled in slot time.
Figure 5A:
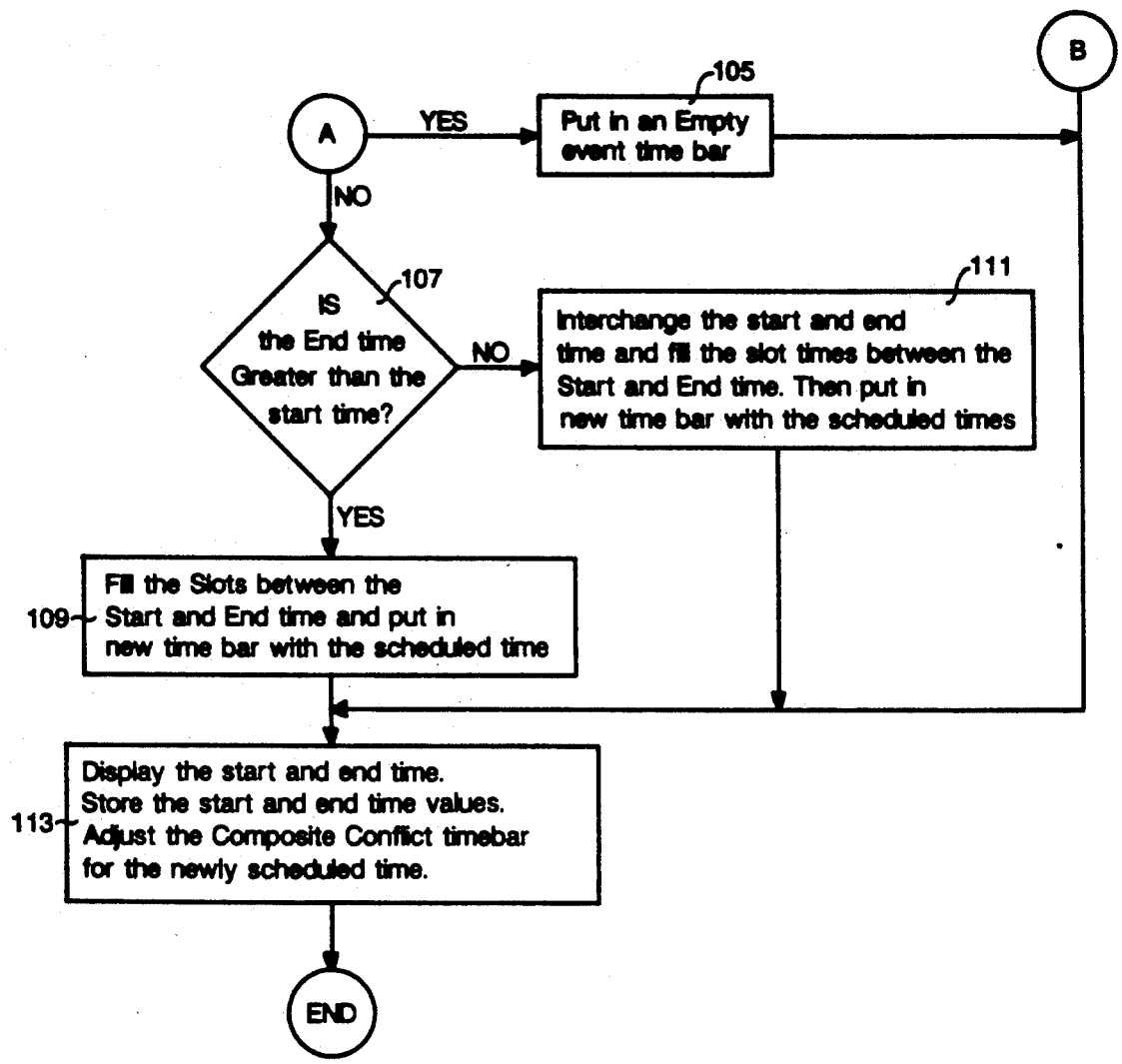
FIG. 5A is a continuation of the flow chart of FIG. 5.

The flow chart shown in FIGS. 5 and 5A generally illustrates the above-described program functions for inputting visual markers on the event time bars (setting the time bars) for the newly created event description. The Hypercard TM script for implementing these program functions is set forth in Appendix A under the program function "setTimebar". The program functions utilize the global variables "TimeMode", "StartTime", and "ViewMode". At block 85 the program first looks for a single click on an empty space in one of the event description fields, and then puts an empty time bar in the adjacent event time graph field in accordance with the start time and time mode variables (block 87). It then looks for another single click on the event time field (block 89) and determines whether this click is on one of the existing event time bars (block 91). If the click is not on a time bar, the program quits (block 92); if it is on an existing time bar, then the program finds the clicked place on the event time bar (block 93), that is, which of the slot times on the time bar has been selected by the mouse. It does this by a program function called "FindClickChar" which returns the clicked slot time of the time bar. The arguments are horizontal pixel locations of the click, Time Mode and the starting pixel locations of the time bar. (The script for the "FindClickChar" function is set forth in Appendix A.) The program then looks to see whether the time bar has a starting time (block 95) and if the answer is "no" the program puts the clicked value in the time bar (block 97) thereby darkening the appropriate slot time. If "yes", the program asks whether the time bar has an end time (block 99). If "yes", then the program directs to put an empty event time bar in the clicked event time bar space (block 101) thereby eliminating any previously placed visual markers on this time bar. If there is no end time, then the program asks whether the start and end times are the same (block 103), that is, whether there is only one blackened slot time. If "yes", the program again replaces the event time bar with an empty time bar (block 105) thereby eliminating the marked slot time; if "no", the programs asks whether the end time is greater than the start time (block 107) and fills in the slot times between the start time and end time if the answer to this question is "yes" (block 109). If the end time is not greater than the start time, then the program interchanges the start and end times and fills the slots between the end and start time (block 111). These filled in sections of the event time bar are generated by the program creating a new event time bar with the completely filled in scheduled time.

When the appropriate slot times have been blackened, the program displays the start and end times in the message strip 44, stores the start and end time values, and adjusts the composite conflict time bar for the newly schedule time (block 113). The composite conflict time bar is adjusted by the "AdjustConflictLine" function above described.

It is therefore seen that the present invention provides a personal time management system and method for graphically displaying time schedules and easily inputting and rearranging schedules directly on a primary visual display of the screen of a computer device using a series of single clicks of a mouse pointing device. The invention also provides readily detected visual indications of a scheduling conflict. Although the invention has been described in considerable detail in the foregoing specification, it is understood that the invention is not intended to be limited to such detail, except as necessitated by the following claims.

APPENDIX - A

1. FUNCTION "setTimeBar"

```
on setTimeBar theStorageField
  global startTime,timeMode,viewMode
  put timeMode into barChar
  do "put the number of lines of" && the target && "into numLines"
  put word 2 of the clickLine into whichLine
  if whichLine > numLines then
    exit setTimeBar
  end if put the value of the clickLine into wholeLine
  put item 1 of the clickLoc into horizLoc
  put the left of the target +4 into fieldLeft
  put findClickChar(horizLoc,fieldLeft,barChar) into theCharClicked put getEmptyBar(startTime,timeMode) into emptyBar
  put getFullBar(startTime,timeMode) into fullBar put emptyBar into newBar
  if wholeLine contains barChar then
    if barChar & barchar is not in wholeLine then
      -- only one character in bar, set second point and fill or
      -- clear first point if clicked second time
      if char theCharClicked of wholeLine is barChar then
        -- do NOTHING, want an empty timeLine
```

```
          else -- not clicked on old single char
            put offset (barChar,wholeLine) into oldChar
              if oldChar > theCharClicked then
                put char theCharClicked to oldChar of fullBar into ¬
                char theCharClicked to oldChar of newBar
              else -- oldChar is first
                put char oldChar to theCharClicked of fullBar into ¬
                char oldChar to theCharClicked of newBar
              end if -- oldChar vs theCharClicked
          end if -- old single vs second loc
        else -- bar exists, start new one
          --multichar timebar, set new single character bar if no shiftkey,
          -- else extend to new point
          if the shiftkey is down then
            put offset (barChar,wholeLine) into barStart
            put char barStart to (the length of wholeLine) of wholeLine into barToEnd
            put numToChar(charToNum(timeMode)+1) into tickChar
            put numToChar(charToNum(timeMode)+2) into blankChar
            put min (offset(tickChar,barToEnd),offset(blankChar,barToEnd)) - 1 into barLength
            if theCharClicked < barStart then
              -- extend to left
              put char theCharClicked to barStart+barLength -1 of fullBar into¬
              char theCharClicked to barStart+barLength -1 of newBar
            else
              -- extend to right from barStart (for either bar internal or offright click
              put char barStart to theCharClicked of fullBar into¬
              char barStart to theCharClicked of newBar
            end if else
            put char theCharClicked of fullBar into char theCharClicked of newBar
          end if
        end if
      else -- no current timebar, set the first point
        put char theCharClicked of fullBar into char theCharClicked of newBar
      end if
      put newBar into the clickLine -- ** calc new time for updating topbar, report field, and datafield,
      -- ** and then update them put getStartTime(newBar,startTime,timeMode,viewMode) into newStart
      put getEndTime(newBar,startTime,timeMode,viewMode) into newEnd
      --dataField & report field
      put line whichLine of fld theStorageField into oldTimeSpan
      put newStart & "," & newEnd & "," & newStart & "," & newEnd into line whichLine of fld
      theStorageField
      put newStart & "," & newEnd into newTimeSpan
      put newStart & " to " & newEnd into fld "Time Set"
      show fld "Time Set"
      put adjustConflictLine(newBar, wholeLine,fld "appttime", fld "todotime",fld "callsTime",
      line 6 of fld "ConflictBar") into line 6 of fld "ConflictBar"
end setTimeBar
```

2. FUNCTION "TimeLinesToNewMode"

```
function TimeLinesToNewMode
theField,theStorField,oldStartTime,newStartTime,oldTimeMode,newTimeMode
  -- this function converts the fed in field to the new time mode and/or offset
  global startTime,timeMode,viewMode
  if the itemdelimiter is not "," then
    put the itemDelimiter into saveDelimiter
    set the itemDelimiter to ","
```

```
      else
        put "," into saveDelimiter
      end if
    if timeMode = "A" then
      put 32 into maxBoxes
    else if timeMode = "F" then
      put 36 into maxBoxes
    else if timeMode = "K" then
      put 48 into maxBoxes
    else if timeMode = "P" then
      put 72 into maxBoxes
    else if timeMode = "U" then
      put 96 into maxBoxes
    end if
    put startTime into localTime
    convert localTime to seconds put getEmptyBar(startTime,TimeMode) into emptyBar
    put getFullBar(startTime,TimeMode) into fullBar
    put empty into updatedField
    repeat with i = 1 to the number of lines of theField
      put line i of theStorField into theTimes
      if theTimes is not ",,," then
        put item 1 of theTimes into barStart
        put item 2 of theTimes into barEnd
        convert barStart to seconds
        convert barEnd to seconds put barStart - localTime into timeOffset
        put (timeOffset/900) +1 into startBox put barEnd - localTime into endOffset
        put (endOffset/900) into endBox if endOffset < 0 then
          put emptyBar into timeLine
        else if startBox > maxBoxes then
          put emptyBar into timeLine
        else
          put max(startBox,1) into startChar
          put min(endBox,maxBoxes) into endChar
          put emptyBar into timeLine
          put char startChar to endChar of fullBar into char startChar to endChar of timeLine
        end if
        put timeLine into line i of updatedField
      else
        put emptyBar into line i of updateField
      end if
    end repeat set the itemDelimiter to saveDelimiter return updatedField
end TimeLinesToNewMode
```

3 FUNCTION "updateAllTimeBars"

```
on updateAllTimeBars
  global timeMode,startTime
  ------------------------------------------------------------
  -- hidden fields "startTimeUsed" and "timeModeUsed" are there to store
  -- the values of the globals used when the card was created or updated to
  -- a new time range. these should have the values recorded here as part of
  -- the update, and should be used in openCard to test for a rebuild
```

```
                buildTopBarScale
                -- adjust all three timebar flds to the new format
                put TimeLinesToNewMode(fld "apptTime",fld "apptTimeStor",fld
            "startTimeUsed",startTime,¬
                fld "timeModeUsed",timeMode) into fld "apptTime"
                put TimeLinesToNewMode(fld "ToDoTime",fld "ToDoTimeStor",fld
            "startTimeUsed",startTime,¬
                fld "timeModeUsed",timeMode) into fld "ToDoTime"
                put TimeLinesToNewMode(fld "CallsTime",fld "CallsTimeStor",fld
            "startTimeUsed",startTime,¬
                fld "timeModeUsed",timeMode) into fld "CallsTime"
                -- build a new conflict line with the new format
                buildConflictsLine fld "ApptTime",fld "ToDoTime",fld "CallsTime"
                setPMBar
                put startTime into fld "startTimeUsed"
                put timeMode into fld "timeModeUsed"
            end updateAllTimeBars
```

4. FUNCTION "buildTopBarScale"

```
            on buildTopBarScale
                global timeMode,startTime,viewMode
                -- this handler creates a new scale for the conflicts bar for when
                -- the time range is changed if timeMode is "A" then
                    --8 hours
                    put 6 into charPerHour
                    put 48 into numChars
                    put
        "(((((!(((((2(((((3(((((4(((((5(((((6(((((7(((((8(((((9((((!0((((!1((((!2(((((1(((((2(((((3(((((4(((((5(
        (((((6(((((7(((((8(((((9((((!0((((!1(((((!2" into baseNumberLine
                    put "BCECBCECBCECBCECBCECBCECBCECBCECI" into tickLine else if timeMode is "F" then
                    -- 9 hours
                    -- 4 chars per hour in numberline
                    put 4 into charPerHour
                    put 36 into numChars
                    put
        "))(!))(2))(3))(4))(5))(6))(7))(8))(9))!0))!1))!2))(1))(2))(3))(4))(5))(6))(7))(8))(9))!0))!1))!2"
        into baseNumberLine
                    put "GHJHGHJHGHJHGHJHGHJHGHJHGHJHGHJH!" into tickLine else if timeMode is "K" then
                    -- 12 hours
                    -- 4 chars per hour in numberline
                    put 4 into charPerHour
                    put 48 into numChars
                    put
        "(((!(((2(((3(((4(((5(((6(((7(((8(((9((!0((!1((!2(((1(((2(((3(((4(((5(((6(((7(((8(((9((!0((!1((!2"
        into baseNumberLine
                    put
        "LMOMLMOMLMOMLMOMLMOMLMOMLMOMLMOMLMOMLMOMLMOMLMOM!"
        into tickLine else if timeMode is "P" then
                    -- 18 hours
                    -- 3 chars per hour in numberline
                    put 3 into charPerHour
                    put 54 into numChars
                    put " (! (2 (3 (4 (5 (6 (7 (8 (9 !0 !1 !2 (1 (2 (3 (4 (5 (6 (7 (8 (9 !0 !1 !2" into
        baseNumberLine
```

```
        put
"QRTRQRTRQRTRQRTRQRTRQRTRQRTRQRTRQRTRQRTRQRTRQRTRQRTRQ
RTRQRTRQRTRQRTRI" into tickLine else if timeMode is "U" then
      -- 24 hours
      put 2 into charPerHour
      put 48 into numChars
      put "(!(2(3(4(5(6(7(8(9!0!1!2(1(2(3(4(5(6(7(8(9!0!1!2" into baseNumberLine
      put
"VWYWVWYWVWYWVWYWVWYWVWYWVWYWVWYWVWYWVWYWVWY
WVWYWVWYWVWYWVWYWVWYWVWYWVWYWVWYWVWYWVWYWVW
YWI" into tickLine end if
   lock screen
   -- calculate where on the list of numbers we start for filling the line out
   put the number of chars of startTime into startLen
   if startLen is 7 then
      put char 1 of startTime into startHour
   else -- startLen should be 8
      put char 1 to 2 of startTime into startHour
   end if if char startLen - 1 of startTime is "P" and char 1 to 2 of startTime ≠ "12" then
      add 12 to startHour
   end if if char startLen - 1 of startTime is "A" and char 1 to 2 of startTime = "12" then
      put 0 into startHour
   end if delete char 1 to charPerHour*startHour of baseNumberLine put char 1 to numChars of baseNumberLine into numberLine
   --if timeMode is "U" then
   put " " into line 1 of fld "ConflictBar"
   put " " into line 2 of fld "ConflictBar"
   put " " into line 3 of fld "ConflictBar"
   --** commented out section deals with possibility for 24 hour bar
   -- at top of fld.
   --else
   -- put "(!(2(3(4(5(6(7(8(9!0!1!2(1(2(3(4(5(6(7(8(9!0!1!2" into line 1 of fld "ConflictBar"
   -- put
"VWYWVWYWVWYWVWYWVWYWVWYWVWYWVWYWVWYWVWYWVWY
WVWYWVWYWVWYWVWYWVWYWVWYWVWYWVWYWVWYWVWYWVW
YWI" into line 2 of fld "ConflictBar"
   -- put getEmptyBar ("00:00 AM","U") into line 3 of fld "ConflictBar"
   -- end if put NumberLine into line 4 of fld "ConflictBar"
   put tickLine into line 5 of fld "ConflictBar"
   put getEmptyBar(startTime,timeMode) into line 6 of fld "ConflictBar"
   unlock screen end buildTopBarScale
```

5. FUNCTION "on newAppt"

```
on newAppt
   global startTime,timeMode
   -- This handler adds a new line to each of the fields that make up
   -- the appointments section.
   put the number of lines of fld "apptList" + 1 into newLineNum
```

```
put "New" & return into line newLineNum of fld "apptList"
put "_" & return into line newLineNum of fld "apptMark"
put "-" & return into line newLineNum of fld "apptP"
put "----" & return into line newLineNum of fld "apptS"
put getEmptyBar(startTime,timeMode) & return into line newLineNum of fld "apptTime"
put ",,,,," & return into line newLineNum of fld "apptTimeStor"
put ",,,,,," & return into line newLineNum of fld "apptScroll"
put " " & return into line newLineNum of fld "apptSave"
put newLineNum * 12 into fullScroll
if fullScroll > the height of fld "apptList" then
    send "setAllScrolls" && fullscroll to fld "apptScroll"
end if -- ** should it be opened for typing?
end newAppt
```

6. FUNCTION "on newToDo"

```
on newToDo
    --** This handler adds a new line to each of the fields that make up
    --** the To Do section.
    global startTime,timeMode
    put the number of lines of fld "ToDoList" + 1 into newLineNum
    put "New" & return into line newLineNum of fld "ToDoList"
    put "_" & return into line newLineNum of fld "ToDoMark"
    put "-" & return into line newLineNum of fld "ToDoP"
    put "----" & return into line newLineNum of fld "ToDoS"
    put getEmptyBar(startTime,timeMode) & return into line newLineNum of fld "ToDoTime"
    put ",,,,," & return into line newLineNum of fld "ToDoTimeStor"
    put ",,,,,," & return into line newLineNum of fld "ToDoScroll"
    put " " & return into line newLineNum of fld "ToDoSave"
    put newLineNum * 12 into fullScroll
    if fullScroll > the height of fld "ToDoList" then
        send "setAllScrolls" && fullscroll to fld "ToDoScroll"
    end if
end newToDo
```

7 FUNCTION "on newCalls"

```
on newCalls
    --** This handler adds a new line to each of the fields that make up
    --** the Calls section.
    global startTime,timeMode
    put the number of lines of fld "CallsList" + 1 into newLineNum
    put "New" & return into line newLineNum of fld "CallsList"
    put "_" & return into line newLineNum of fld "CallsMark"
    put "-" & return into line newLineNum of fld "CallsP"
    put "----" & return into line newLineNum of fld "CallsS"
    put getEmptyBar(startTime,timeMode) & return into line newLineNum of fld "CallsTime"
    put ",,,,," & return into line newLineNum of fld "CallsTimeStor"
    put ",,,,,," & return into line newLineNum of fld "CallsScroll"
    put " " & return into line newLineNum of fld "CallsSave"
    put newLineNum * 12 into fullScroll
    if fullScroll > the height of fld "CallsList" then
        send "setAllScrolls" && fullscroll to fld "CallsScroll"
    end if
end newCalls
```

8. XFunction "findClickChar"

```
--*********** this one is compiled
-- function findClickChar horizLoc,fieldLeft,barChar
-- -- this function should return the number of the char form the left end of the
```

```
-- -- clicked line
-- --
-- -- the first if-then clause should be edited to deal with the width of the chars
-- -- designated to represent the time bar in each particular timespan -- if barChar = "A" then
-- put 9 into charWidth
-- else if barChar = "F" then
-- put 8 into charWidth
-- else if barChar = "K" then
-- put 6 into charWidth
-- else if barChar = "P" then
-- put 4 into charWidth
-- else if barChar = "U" then
-- put 3 into charWidth
-- end if -- -- calculate the number of chars over from the left side
-- put trunc((horizLoc-fieldLeft)/charWidth)+1 into theChar
-- return theChar
-- end findClickChar
```

9. FUNCTION "do singleClick"

```
on doSingleClick whichLine
  -- need to determine which palette, and set loc   palette cmdWNew,
  if the visible of fld "entry" then hide fld "entry"
  put line whichLine of me into line 1 of fld "entry"
  put the scroll of me into theScroll
  put the textHeight of me into lineHigh
  put the top of me into theTop
  put (whichLine - .5) * lineHigh into scrollToLine
  put theTop - theScroll + scrollToLine into centerVert -- show entry field & popup menu pointer
  show fld "entry" at 110, centerVert
  show bg btn "pointer" at the right of me -20,centerVert
  select text of fld "entry"
end doSingleClick
```

10. FUNCTION "doDoubleClick"

```
on doDoubleClick
  put the clickLine into whereClicked
  do "put the short name of fld " & word 6 of whereClicked && "into clickFld"
  if clickFld is the short name of me then
    put word 2 of whereClicked into theLine
    select line theLine of fld "apptList"
    goApptDetail theLine
  end if end doDoubleClick
```

11. XFunction "adjustConflictLine"

```
****** this one is compiled
function adjustConflictLine theLine,oldLine,field1,field2,field3,conflictLine
  --** this handler will update the Conflict line to reflect the changed timebar
  global timeMode
  put timeMode into barChar
  put numToChar(charToNum(timeMode)+1) into tickChar
  put numToChar(charToNum(timeMode)+2) into blankChar
  put numToChar(charToNum(timeMode)+3) into conflictChar
```

```
if last char of field1 is not return then put return after field1
if last char of field2 is not return then put return after field2
put field1 & field2 & field3 into bigList repeat with i = 1 to the number of chars of theLine put char i of theLine into matchChar
  put char i of conflictLine into listChar
  put char i of oldLine into oldChar
  if matchChar ≠ oldChar then -- if they're the same do nothing
    if matchChar is barChar then
      if listChar ≠ conflictChar then
        if listChar = barChar then
          put conflictChar into char i of conflictLine
        else
          put barChar into char i of conflictLine
        end if
      end if -- listChar ≠ conflictChar
    else -- matchChar went bar to blank or tick
      if listChar is barChar then
        put matchChar into char i of conflictLine
      else -- listChar is conflictChar, we need to see if it's only two way or more
        put 0 into conflicts
        put barChar into char i of conflictLine
        repeat with k = 1 to the number of lines of bigList
          if char i of line k of bigList is barChar then
            add 1 to conflicts
          end if
        end repeat
        if conflicts > 1 then
          put conflictChar into char i of conflictLine
        end if end if -- what is listChar?

end if -- what is matchChar
  end if -- matchChar ≠ oldChar end repeat return conflictLine
end adjustConflictLine
```

12. XFunction "getEmptyBar"

```
- ••••••• this one compiled
function getEmptyBar startTime,timeMode
-••
put whichQuarterHour(startTime) into offsetInLine
if timeMode is "A" then -- 8 hours
should return segment of a default string of length 32 offset
from bar beginning by offsetInLine
put "BCCCBCCCBCCCBCCCBCCCBCCCBCCCBCCCl" into emptyBar
else if timeMode is "F" then -- 9 hours
should return segment of a default string of length 36 offset
from bar beginning by offsetInLine
put "GHHHGHHHGHHHGHHHGHHHGHHHGHHHGHHHGHHHl" into emptyBar
else if timeMode is "K" then -- 12 hours
should return segment of a default string of length 48 offset
from bar beginning by offsetInLine
put
"LMMMLMMMLMMMLMMMLMMMLMMMLMMMLMMMLMMMLMMMLMMMLMMM
l" into emptyBar
```

```
else if timeMode is "P" then -- 18 hours
put
"QRRRQRRRQRRRQRRRQRRRQRRRQRRRQRRRQRRRQRRRQRRRQRRRQRR
RQRRRQRRRQRRRQRRRI" into emptyBar
else if timeMode is "U" then -- 24 hours
put
"VWWWVWWWVWWWVWWWVWWWVWWWVWWWVWWWVWWWVWWWVWWWVWW
WVWWW" &¬

"VWWWVWWWVWWWVWWWVWWWVWWWVWWWVWWWVWWWVWWWVWWWVWWW
WVWWWI" into emptyBar
else
end if
return emptyBar
end getEmptyBar
```

13. XFunction  "getFullBar"

```
--** this one compiled
function getFullBar startTime,timeMode
--**
if timeMode is "A" then -- 8 hours
put "AAAAAAAAAAAAAAAAAAAAAAAAAAAAAAAA" into fullBar
else if timeMode is "F" then -- 9 hours
should return segment of a default string of length 32 offset
from bar beginning by offsetInLine
put "FFFFFFFFFFFFFFFFFFFFFFFFFFFFFFFF" into fullBar
else if timeMode is "K" then -- 12 hours
should return segment of a default string of length 48 offset
from bar beginning by offsetInLine
put
"KKKKKKKKKKKKKKKKKKKKKKKKKKKKKKKKKKKKKKKKKKKKKKKK"
into fullBar
else if timeMode is "P" then -- 18 hours
put
"PPPPPPPPPPPPPPPPPPPPPPPPPPPPPPPPPPPPPPPPPPPPPPPPPPPPPPPPPPPPPPPP
PPPPPPPPP" into fullBar else if timeMode is "U" then -- 24 hours put
"UUUUUUUUUUUUUUUUUUUUUUUUUUUUUUUUUUUUUUUUUUUUUUUU"
&¬
"UUUUUUUUUUUUUUUUUUUUUUUUUUUUUUUUUUUUUUUUUUUUUUUU"
into fullBar
else
end if
return fullBar
end getFullBar
```

14. XFunction  "getStartTime"

```
--**** this one is compiled
function getStartTime timeLine,startTime,timeMode,viewMode
--this function should extract the start time of a timeline
--check that we're doing days
--use timeMode as the bar character in use
--get the offset of the first char that is a bar char
--calc from startTime to the offset to return the bar start time point
if viewMode is "day" then
---timeModes we'll use:
---A for 8 hours
-- F for 9 hours
-- K for 12 hours
```

-- P for 18 hours
-- U for 24 hours put offset (timeMode,timeLine) into theTimeOffset
if theTimeOffset = 0 then
  return empty
else _Date2Secs startTime,localtime
  -- 900 seconds in 15 minutes, which is one bar unit
  add 900*(theTimeOffset-1) to localTime
  convert localTime to short time end if
-- ** deal with weeks and months later
--******else
--******end if return localTime
end getStartTime

15. XFunction "getEndTime"

- **** this one is compiled
function getEndTime timeLine,startTime,timeMode,viewMode
  -- this function should extract the end time of a timeline -- check that we're doing days
  -- use timeMode to determine which bar character is in use
  -- get the offset of the first char that is a bar char
  -- add in the length of the bar -1
  -- calc from startTime to the adjusted offset to return the bar end time point
  --*****if viewMode is "day" then
  -- timeModes we'll use:
  -- A for 8 hours
  -- F for 9 hours
  -- K for 12 hours
  -- P for 18 hours
  -- U for 24 hours
  put offset (timeMode,timeLine) into theTimeOffset
  if theTimeOffset = 0 then
    return empty
  else -- **add length of timeBar
    -- speed can be gained here by using offset for vert bar & underbar only
    -- from the first timeBar char
    -- and using the smaller as the value +1 for the length of the bar
    put 0 into barCount
repeat with i = theTimeOffset+1 to the length of timeLine
  if char i of timeLine is timeMode then
    add 1 to barCount
  else
    exit repeat
  end if
end repeat
add barCount to theTimeOffset _Date2Secs startTime,localtime
-- 900 seconds in 15 minutes, which is one bar unit
add 900*(theTimeOffset) to localTime
convert localTime to short time
end if

```
----else
-- ** deal with weeks and months later
----***end if
return localTime
end getEndTime
```

16: XFunction XConflictbar.c

```c
#include "HyperXCmd.h"
/*times are delimited by commas and returns*/
#define TIMEDELIMS ",\15"

/* IsADelim()
  returns true of character c is part of c string d,
  else returns false
*/
char IsADelim(char c, char *d) {
        /*for each delim character*/
        for (; *d != 0; d++)
                if (c == *d) return 1;
        return 0;
        }

/* NextItem()
  copies next item (starting from **string) bounded by
  the next delim character or null or limit bytes, into *item in
  c format. function does not update the pointer used.
  *MAKE SURE LIMIT IS ONE LESS THAN STORAGE AVAILABLE*
*/
void NextItem(char *string, char *item, char *delim, unsigned char limit) {
        int i;
        for (i = 0; i < limit; i++) {
                /*test for terminator*/
                if ( string[i] == 0 ) break;
                /*test for delimeter*/
                if (IsADelim(string[i], delim)) break;
                /*copy element, this item is ok*/
                item[i] = string[i];
                }
        /*add a zero*/
        item[i] = 0;
        }

/*scans forward to beginning of next item or 0 terminator
*/
void ScanToNextItem( char **c, char *delim ) {
        char *cptr;
        cptr = *c;
        for (; *cptr != 0; cptr++)
                /*test for delimeter*/
                if (IsADelim(*cptr, delim)) { cptr++; break; }
        *c = cptr;
        } int TimeToSlot(char *c) {
        char hour[5], minutes[5], ap[5];
        int thehour, theminutes;
        if (*c == 0) return -1;
   /*get hour, min, and ap*/
        NextItem(c, &hour, ":", 2);
        ScanToNextItem(&c, ":");
```

```c
            NextItem(c, &minutes, ": ", 2);
            ScanToNextItem(&c, " ");
            NextItem(c, &ap, " ", 2);
    /*figure out the hour*/
            if (hour[0] == 0) return -1;
            thehour = hour[0] - '0';
            if (hour[1] != 0)
                    thehour = thehour * 10 + hour[1] - '0';
    /*figure out the minutes*/
            if (minutes[0] == 0 || minutes[1] == 0) return -1;
            theminutes = (minutes[0] - '0') * 10 + minutes[1] - '0';
    /*figure out ap*/
            if (ap[0] != 0) {
                    thehour = thehour % 12;
                    if (ap[0] == 'p' || ap[0] == 'P') thehour += 12;
            }
    /*return the resulting time slot*/
            return (thehour * 4 + theminutes / 15);
    }

/* OrIt()
   takes the times and sets the appropriate bits

*/
void OrIt(char *c, char *o) {
        char line[61], stime[11], etime[11], *tag;
        int start, end, i;
        /*until we hit the end of c*/
        while (*c != 0) {
                /*get the line*/
                NextItem(c, line, "\15", 60);
                ScanToNextItem(&c, "\15");
                /*get the next two times*/
                tag = line;
                NextItem(tag, stime, TIMEDELIMS, 10);
                ScanToNextItem(&tag, TIMEDELIMS);
                NextItem(tag, etime, TIMEDELIMS, 10);
                /*get the start and end 15-min slots*/
                start = TimeToSlot(stime);
                end = TimeToSlot(etime);
                /*set the bits for those*/
                if (start >= 0 && end >= start)
                        for (i = start; i < end; i++) o[i] += 1;
                else
                        if (end == 0) {
                                end = 96;
                                for (i = start; i < end; i++) o[i] += 1;
                        }
        }
}

/*takes pointer to the start time and returns the hour*/
int StartHour(char *c) {
        int slot, i;
        if (*c > '9' || *c < '0') return 0;
        slot = *c - '0';
        c++;
        if (*c >= '0' && *c <= '9') {
                slot = slot * 10 + (*c - '0');
                c++;
        }
        if (*c != ':') return 0;
```

```
          c++;
          if (*c < '0' || *c > '9') return 0;
          c++;
          if (*c < '0' || *c > '9') return 0;
          c++;
          if (*c != ' ') return slot;
          c++;
          if (*c != 'P' && *c != 'A') return slot;
          if (*c == 'P') {
                  if (slot < 12) slot += 12;
                  return slot;
                  }
          else {
                  if (slot == 12) return 0;
                  return slot;
                  }
          } void appendchar(char **c, char h) {
          (**c) = h;
          (*c) += 1;
          } pascal void main(XCmdPtr paramPtr) {
          int i, ST;
          char ors[96], TM, pstr[256], qstr[256], *ct;
          Handle h;

/*lock down the three handles and put it in ors*/
          for (i = 0; i <= 95; i++) ors[i] = 0;
          HLock(paramPtr->params[0]);
          OrIt(*(paramPtr->params[0]), &ors);
          HUnlock(paramPtr->params[0]);
          HLock(paramPtr->params[1]);
          OrIt(*(paramPtr->params[1]), &ors);
          HUnlock(paramPtr->params[1]);
          HLock(paramPtr->params[2]);
          OrIt(*(paramPtr->params[2]), &ors);
          HUnlock(paramPtr->params[2]);

/*get time mode and start time*/
          h = GetGlobal(paramPtr, "\ptimeMode");
          TM = **h;
          DisposHandle(h);
          switch (TM) {
                  case 'A': TM = 8;  break;
                  case 'F': TM = 9;  break;
                  case 'K': TM = 12; break;
                  case 'P': TM = 18; break;
                  case 'U': TM = 24; break;
                  default: return;
                  }
          /*get the start time*/
          h = GetGlobal(paramPtr, "\pstartTime");
          HLock(h);
          ST = StartHour(*h);
          DisposHandle(h);

/*the conflict has been figured out, now fill the return string*/
          for (i = 0; i <= 255; i++) pstr[i] = 0;
          ct = &pstr[0];
          for (i = ST; i <= 23; i++) {
                  if (ors[i*4+0] == 0) /*first is empty*/
```

```
            switch (TM) {
                    case 8:  appendchar(&ct, 143); break;
                    case 9:  appendchar(&ct, 144); break;
                    case 12: appendchar(&ct, 145); break;
                    case 18: appendchar(&ct, 146); break;
                    case 24: appendchar(&ct, 147); break;
            }
    else if (ors[i*4+0] == 1) /*first is full*/
            switch (TM) {
                    case 8:  appendchar(&ct, 128); break;
                    case 9:  appendchar(&ct, 129); break;
                    case 12: appendchar(&ct, 130); break;
                    case 18: appendchar(&ct, 131); break;
                    case 24: appendchar(&ct, 132); break;
            }
    else /*first is overfull*/
            switch (TM) {
                    case 8:  appendchar(&ct, 133); break;
                    case 9:  appendchar(&ct, 134); break;
                    case 12: appendchar(&ct, 135); break;
                    case 18: appendchar(&ct, 136); break;
                    case 24: appendchar(&ct, 137); break;
            } if (ors[i*4+1] == 0) /*second is empty*/
            switch (TM) {
                    case 8:  appendchar(&ct, 143); break;
                    case 9:  appendchar(&ct, 144); break;
                    case 12: appendchar(&ct, 145); break;
                    case 18: appendchar(&ct, 146); break;
                    case 24: appendchar(&ct, 147); break;
            }
    else if (ors[i*4+1] == 1) /*second is full*/
            switch (TM) {
                    case 8:  appendchar(&ct, 128); break;
                    case 9:  appendchar(&ct, 129); break;
                    case 12: appendchar(&ct, 130); break;
                    case 18: appendchar(&ct, 131); break;
                    case 24: appendchar(&ct, 132); break;
            }
    else /*second is overfull*/
            switch (TM) {
                    case 8:  appendchar(&ct, 133); break;
                    case 9:  appendchar(&ct, 134); break;
                    case 12: appendchar(&ct, 135); break;
                    case 18: appendchar(&ct, 136); break;
                    case 24: appendchar(&ct, 137); break;
            }
    if (ors[i*4+2] == 0) /*third is empty*/
            switch (TM) {
                    case 8:  appendchar(&ct, 143); break;
                    case 9:  appendchar(&ct, 144); break;
                    case 12: appendchar(&ct, 145); break;
                    case 18: appendchar(&ct, 146); break;
                    case 24: appendchar(&ct, 147); break;
            }
    else if (ors[i*4+2] == 1) /*third is full*/
            switch (TM) {
                    case 8:  appendchar(&ct, 128); break;
                    case 9:  appendchar(&ct, 129); break;
                    case 12: appendchar(&ct, 130); break;
                    case 18: appendchar(&ct, 131); break;
                    case 24: appendchar(&ct, 132); break;
            }
```

```
                else /*third is overfull*/
                    switch (TM) {
                        case 8:  appendchar(&ct, 133); break;
                        case 9:  appendchar(&ct, 134); break;
                        case 12: appendchar(&ct, 135); break;
                        case 18: appendchar(&ct, 136); break;
                        case 24: appendchar(&ct, 137); break;
                    } if (ors[i*4+3] == 0) /*fourth is empty*/
                switch (TM) {
                    case 8:  appendchar(&ct, 138); break;
                    case 9:  appendchar(&ct, 139); break;
                    case 12: appendchar(&ct, 140); break;
                    case 18: appendchar(&ct, 141); break;
                    case 24: appendchar(&ct, 142); break;
                }
            else if (ors[i*4+3] == 1) /*fourth is full*/
                switch (TM) {
                    case 8:  appendchar(&ct, 128); break;
                    case 9:  appendchar(&ct, 129); break;
                    case 12: appendchar(&ct, 130); break;
                    case 18: appendchar(&ct, 131); break;
                    case 24: appendchar(&ct, 132); break;
                }
            else /*fourth is overfull*/
                switch (TM) {
                    case 8:  appendchar(&ct, 133); break;
                    case 9:  appendchar(&ct, 134); break;
                    case 12: appendchar(&ct, 135); break;
                    case 18: appendchar(&ct, 136); break;
                    case 24: appendchar(&ct, 137); break;
                }
    }
    ZeroToPas(paramPtr, pstr, &qstr);
    paramPtr->returnValue = PasToZero(paramPtr, qstr);
}
```

What we claim is:

1. A personal time management system comprising a computer device having a display screen, program means for said computer device for generating a visual display, including a primary visual display, on said display screen, said visual display including selectable user interface display elements associated with selectable calendar days, said selectable display elements for each of said selectable calendar days including a plurality of separate and selectable event time graphs displayed on said primary visual display, each of said separate event time graphs further including selectable event slot times having defined start times, screen pointing means for pointing to and selecting the user interface display elements generated on said display screen including means for pointing to and selecting an event slot time on any one of said separate event time graphs so as to display a visual marker at the selected event slot time thereby permitting the user to directly mark on the primary visual display the desired time of an event, said visual display further including a composite time graph having composite slot times corresponding to event slot times displayed on said separate event time graphs, and said program means including program means for displaying visual markers on said composite time graph at composite slot times which correspond to event slot times marked on said separate event time graphs, and means associated with said visual display for identifying the events associated with each of said separate event time graphs.

2. The personal time management system of claim 1 wherein said program means for displaying visual markers at composite slot times causes visual markers to appear on said composite time graph automatically and substantially simultaneously when a corresponding event slot time is marked on a selected event time graph.

3. A personal time management system comprising a computer device having a display screen, program means for said computer device for generating a visual display, including a primary visual display, on said display screen, said visual display including selectable user interface display elements associated with selectable calendar days, said selectable display elements for each of said selectable calendar days including parallel rows of time bars on said primary visual display, each of said event time bars further including selectable event slot times having defined start times and a defined time intervals, said primary visual display further including a composite time bar having composite slot times corresponding to event slot times displayed on said event time bars, and screen pointing means for pointing to and selecting the user interface display elements generated on said display screen including means for pointing to and selecting and deselecting an event slot time on any one of said separate event time bars so as to display and remove a visual marker at the selected event slot time thereby permitting the user to directly and removably mark on the primary visual display the desired time of an event, said program means including program means for removably displaying visual markers on said composite time bar at composite slot times which correspond to event slot times marked on said event time bars, and means associated with said visual display for identifying the events associated with each of said event time bars.

4. The personal time management system of claim 3 wherein said program means for displaying visual markers at composite slot times causes said visual marker to appear on said composite time bar automatically and substantially simultaneously when a corresponding event slot time is marked on a selected event time bar.

5. The personal time management system of claim 3 wherein said screen pointing means for pointing to and selecting the user interface display elements generated on said display screen further includes means for pointing to and selecting a slot time on an event time bar having a previously marked slot time so as to extend the time interval of said previously placed visual marker thereby permitting the user to extend the time allotted a schedule event.

6. A method for inputting and displaying a time schedule on the display screen of a computer device having a user operated screen pointer device, said method comprising the steps of providing a primary visual display on said display screen having separate user-selectable event time graphs for scheduling separate events, each of said time graphs having selectable event slot times having defined start times, using said screen pointer device to point to and select slot times on the event time graphs on said primary visual display so as to place visual markers at said slot times which indicate the time schedule for such events, providing on said primary visual display a composite time graph having composite time slots corresponding to event slot times displayed on said separate event time graphs, and displaying visual markers on said composite time graph at composite slot times which correspond to event slot times marked on said separate event time graphs.

7. The method of claim 6 wherein the composite slot time markers are displayed on said composite time graph automatically and substantially simultaneously when a corresponding event slot time is selected on a event time graph.

8. A method for inputting and displaying a time schedule on the visual display of a computer device having a user operated screen pointer device, said method comprising the steps of providing a primary visual display having separate user-selectable event time graphs for scheduling separate events, each of said time graphs having selectable event slot times having defined start times and end times, using said screen pointer device to do the following:
  i. to point to and select slot times on the event time graphs on said primary visual display so as to place visual markers at slot times which indicate the time schedule for such events,
  ii. to point to and select slot times having previously placed visual markers so as to remove said visual markers and so as to shorten or remove previously scheduled events on an event time graph, and
  iii. to point to and a select a slot time on an event time graph already having a marked slot time so as to extend the time interval of said previously placed visual marker thereby permitting the user to extend the time allotted a schedule event, providing on said primary visual display a composite time graph having composite slot times corresponding to event slot times displayed on said separate event time graphs, and displaying visual markers on said composite time graph at composite slot times which correspond to event slot times marked on said separate event time graphs.

9. The method of claim 8 further including the step of providing an event description field associated with each event time graph in which an event description can be entered, said event description field being displayed on said primary visual display so as not to require an intrusive secondary pop-up display.

10. The method of claim 8 wherein said screen pointer device selects slot times by a single click function and wherein an event can be scheduled, extended, shortened and removed on its event time graph by a series of single clicks.

* * * * *